(12) United States Patent
Noguchi

(10) Patent No.: US 11,765,281 B2
(45) Date of Patent: *Sep. 19, 2023

(54) IMAGE PROCESSING APPARATUS, IMAGE PROCESSING METHOD, AND IMAGE PROCESSING PROGRAM UTILIZING A PLURALITY OF DISPLAY REGIONS

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,031

(22) Filed: Jun. 29, 2022

(65) Prior Publication Data
US 2022/0400182 A1    Dec. 15, 2022

Related U.S. Application Data

(60) Division of application No. 17/200,156, filed on Mar. 12, 2021, now Pat. No. 11,394,836, which is a
(Continued)

(30) Foreign Application Priority Data

Sep. 25, 2018    (JP) .................................. 2018-178684

(51) Int. Cl.
*H04N 1/00*    (2006.01)
(52) U.S. Cl.
CPC ..... *H04N 1/00196* (2013.01); *H04N 1/00145* (2013.01); *H04N 1/00161* (2013.01); *H04N 1/00177* (2013.01)

(58) Field of Classification Search
None
See application file for complete search history.

(56) References Cited

U.S. PATENT DOCUMENTS 7,656,543 B2    2/2010 Atkins
8,325,398 B2    12/2012 Satomi et al.
(Continued)

FOREIGN PATENT DOCUMENTS

JP    H11-096331 A    4/1999
JP    2002-335487 A    11/2002
(Continued)

OTHER PUBLICATIONS

International Search Report issued in PCT/JP2019/030335; dated Oct. 29, 2019.
(Continued)

*Primary Examiner* — Henok Shiferaw
(74) *Attorney, Agent, or Firm* — Studebaker & Brackett PC

(57) ABSTRACT

An image processing apparatus, an image processing method, and an image processing program for relatively easily creating an album similar to an example album are provided. A page of an example album is displayed in a page display region, and one example image among images pasted on the page is displayed in an example image display region. An image similar to the example image is displayed in a selected image region. In a case where a decision button is clicked, the image is pasted at a position at which the example image is pasted. Similarly, an album is created by finding images similar to example images and the like pasted in an image pasting region. The album similar to the example album is created.

13 Claims, 12 Drawing Sheets

Related U.S. Application Data continuation of application No. PCT/JP2019/030335, filed on Aug. 1, 2019.

(56) References Cited

U.S. PATENT DOCUMENTS

| | | | |
|---|---|---|---|
| 10,075,653 B2 * | 9/2018 | Jeong | H04N 23/61 |
| 2005/0128518 A1 * | 6/2005 | Tsue | G06T 11/60 |
| | | | 358/1.15 |
| 2005/0134946 A1 | 6/2005 | Tsue et al. | |
| 2005/0134947 A1 | 6/2005 | Tsue et al. | |
| 2005/0219665 A1 * | 10/2005 | Mino | H04N 1/00132 |
| | | | 358/1.18 |
| 2006/0155612 A1 | 7/2006 | Haeberli | |
| 2007/0064278 A1 | 3/2007 | Sugimoto | |
| 2011/0216368 A1 * | 9/2011 | Tsue | H04N 1/00448 |
| | | | 358/1.15 |
| 2011/0242336 A1 * | 10/2011 | Yamaji | G06V 20/40 |
| | | | 348/207.2 |
| 2012/0020648 A1 | 1/2012 | Yamaji | |
| 2012/0076398 A1 | 3/2012 | Yamaji et al. | |
| 2012/0284594 A1 | 11/2012 | Norwood et al. | |
| 2013/0050278 A1 | 2/2013 | Watari et al. | |
| 2015/0095825 A1 | 4/2015 | Yamamoto | |
| 2015/0095827 A1 | 4/2015 | Yamamoto et al. | |
| 2017/0249767 A1 | 8/2017 | Fuss et al. | |
| 2018/0084119 A1 | 3/2018 | Yoshida | |
| 2020/0234076 A1 | 7/2020 | Katsumata | |
| 2021/0049201 A1 * | 2/2021 | Noguchi | G06V 40/173 |

FOREIGN PATENT DOCUMENTS

| | | |
|---|---|---|
| JP | 2003-116094 A | 4/2003 |
| JP | 2005-184789 A | 7/2005 |
| JP | 2005-184790 A | 7/2005 |
| JP | 2006-072824 A | 3/2006 |
| JP | 2010-198078 A | 9/2010 |
| JP | 2016-018418 A | 2/2016 |
| JP | 2017-049844 A | 3/2017 |
| JP | 2017-054523 A | 3/2017 |

OTHER PUBLICATIONS

International Preliminary Report on Patentability and Written Opinion issued in PCT/JP2019/030335; dated Mar. 23, 2021.

An Office Action; "Notice of Reasons for Refusal", mailed by the Japanese Patent Office dated May 24, 2022, which corresponds to Japanese Patent Application No. 2020-548081 and is related to U.S. Appl. No. 17/200,156; with English language translation.

An Office Action; "Notice of Reasons for Refusal," mailed by the Japanese Patent Office dated Nov. 16, 2022, which corresponds to Japanese Patent Application No. 2020-548081 and is related to U.S. Appl. No. 17/853,031; with English language translation.

Decision of Refusal mailed by the Japanese Patent Office dated Apr. 11, 2023, which corresponds to Japanese Patent Application No. 2020-548081 and is related to U.S. Appl. No. 17/853,031; with English language translation.

Decision of Dismissal of Amendment mailed by the Japanese Patent Office dated Apr. 11, 2023, which corresponds to Japanese Patent Application No. 2020-548081 and is related to U.S. Appl. No. 17/853,031; with English anguage translation.

* cited by examiner

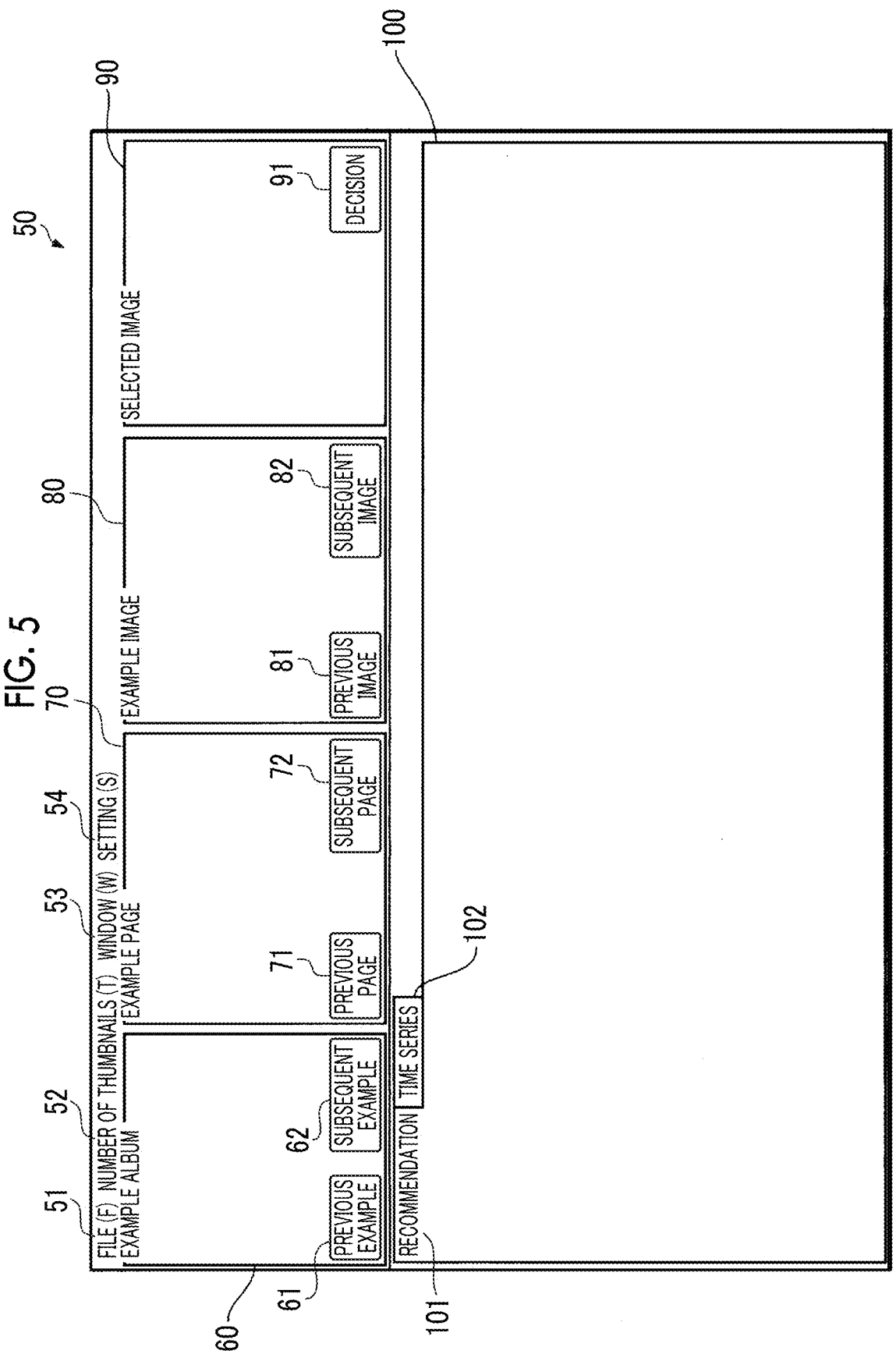

FIG. 6

TEMPLATE T1

EXAMPLE ALBUM Ab1 — EXAMPLE IMAGE Ir100 TO EXAMPLE IMAGE Ir199
EXAMPLE ALBUM Ab2 — EXAMPLE IMAGE Ir200 TO EXAMPLE IMAGE Ir299
EXAMPLE ALBUM Ab3 — EXAMPLE IMAGE Ir300 TO EXAMPLE IMAGE Ir399
EXAMPLE ALBUM Ab4 — EXAMPLE IMAGE Ir400 TO EXAMPLE IMAGE Ir499
EXAMPLE ALBUM Ab5 — EXAMPLE IMAGE Ir500 TO EXAMPLE IMAGE Ir599
EXAMPLE ALBUM Ab6 — EXAMPLE IMAGE Ir600 TO EXAMPLE IMAGE Ir699
EXAMPLE ALBUM Ab7 — EXAMPLE IMAGE Ir700 TO EXAMPLE IMAGE Ir799
EXAMPLE ALBUM Ab8 — EXAMPLE IMAGE Ir800 TO EXAMPLE IMAGE Ir899
EXAMPLE ALBUM Ab9 — EXAMPLE IMAGE Ir900 TO EXAMPLE IMAGE Ir999
EXAMPLE ALBUM Ab10 — EXAMPLE IMAGE Ir1000 TO EXAMPLE IMAGE Ir1099

IMAGE PROCESSING APPARATUS, IMAGE PROCESSING METHOD, AND IMAGE PROCESSING PROGRAM UTILIZING A PLURALITY OF DISPLAY REGIONS

CROSS-REFERENCE TO RELATED APPLICATIONS

This application is a Divisional Applications of U.S. patent application Ser. No. 17/200,156 filed on Mar. 12, 2021, which is a Continuation of PCT International Application No. PCT/JP2019/030335 filed on Aug. 1, 2019, which claims priority under 35 U.S.C. § 119(a) to Japanese Patent Applications No. 2018-178684 filed on Sep. 25, 2018. Each of the above application(s) is hereby expressly incorporated by reference, in its entirety, into the present application.

BACKGROUND OF THE INVENTION

1. Field of the Invention

The invention relates to an image processing apparatus, an image processing method, and an image processing program.

2. Description of the Related Art

There are increasing opportunities to perform capturing along with widespread use of a digital camera, a smartphone, or the like, and the number of images obtained by capturing has been significantly increased. Many images are mostly recorded in a main body of the digital camera, the smartphone, or the like, a memory card, or the like in an image data format. Finding a desired image from a significantly large number of images is difficult, and thus, there may be few opportunities to browse a captured image. Thus, it is considered that the desired image is kept as a paper album from a large number of captured images. For example, a photo book is created in a layout corresponding to a worldview of a picture book (JP2016-018418A), or an album of the same quality can be created (JP2005-184789A). In addition, since adjustment such as image correction may be performed in a case of editing the album, it is considered that a sample image is displayed at a time of adjustment such as the image correction (JP2010-198078A).

SUMMARY OF THE INVENTION

In a case of creating the album, a user may feel significantly inconvenient in a case where the user performs all of selection of an image to be pasted in the album, decision of a position at which the selected image is to be pasted in the album, decision of a size of the image to be pasted in the album, and the like. An image appropriate for the album may not be selected, or the image may not be pasted at an appropriate position, and a degree of completion of the album may be decreased. In JP2016-018418A, an album having the worldview of the picture book is created, and creating an album having a high degree of completion relatively easily is not considered. In JP2005-184789A, a sample image having composition of an image to be inserted into an image insertion region of a template is inserted into the image insertion region as a guidance image. However, the image insertion region of the template displayed on a display screen is relatively small, and thus, the guidance image is not easily viewed, and it is difficult to select the image to be inserted into the image insertion region of the template. In JP2010-198078A, creating the album is not considered.

An object of the invention is to enable an album having a high degree of completion to be relatively easily created.

An image processing apparatus according to the invention comprises a first display control device (first display control means) that controls a display device to display a first display region on a display screen, the first display region displaying a page of an album composed of a plurality of pages, a second display control device (second display control means) that controls the display device to display a second display region on the display screen, the second display region displaying one image of images pasted in an image pasting region of the page displayed in the first display region, and a third display control device (third display control means) that controls the display device to display a third display region on the display screen, the third display region displaying an image different from the image displayed in the second display region.

The invention also provides an image processing method appropriate for the image processing apparatus. That is, the method comprises controlling a display device to display a first display region on a display screen by a first display control device, the first display region displaying a page of an album composed of a plurality of pages, controlling the display device to display a second display region on the display screen by a second display control device, the second display region displaying one image of images pasted in an image pasting region of the page displayed in the first display region, and controlling the display device to display a third display region on the display screen by a third display control device, the third display region displaying an image different from the image displayed in the second display region.

In the invention, an image processing apparatus may include a processor, and the processor may control a display device to display a first display region on a display screen, the first display region displaying a page of an album composed of a plurality of pages, control the display device to display a second display region on the display screen, the second display region displaying one image of images pasted in an image pasting region of the page displayed in the first display region, and control the display device to display a third display region on the display screen, the third display region displaying an image different from the image displayed in the second display region.

The invention also provides a program that controls a computer of an image processing apparatus and is readable by the computer, and a recording medium storing the program.

For example, the third display control device may display, in the third display region, an image of which a degree of similarity with the image displayed in the second display region is greater than or equal to a threshold value.

An image input device that inputs a plurality of images may be further comprised. In this case, for example, the third display control device may display, in the third display region, an image of which a degree of similarity with the image displayed in the second display region is greater than or equal to a threshold value among the plurality of images input from the image input device.

A fourth display control device (means) that controls the display device to display a fourth display region on the display screen, the fourth display region displaying the plurality of images input from the image input device, may be further comprised.

For example, the fourth display control device may display, in the fourth display region, the plurality of images input from the image input device in order of a degree of similarity with images to be displayed in the third display region.

The degree of similarity may be increased as at least one of the degree of similarity with the image displayed in the second display region, a degree of matching of information with respect to a face included in the image displayed in the second display region, or a degree of matching of a capturing timing with respect to the image displayed in the second display region is increased.

A designation device that designates any image of the plurality of images displayed in the fourth display region may be further comprised. In this case, for example, the third display control device displays the image designated by the designation device in the third display region.

A fifth display control device (fifth display control means) that controls the display device to display a fifth display region on the display screen, the fifth display region displaying at least one album of a plurality of albums, may be further comprised. In this case, for example, the first display control device displays, in the first display region, a page of the album displayed in the fifth display region.

A selection device that selects a template of an album may be further comprised. In this case, for example, the fifth display control device displays an album corresponding to the template selected by the selection device in the fifth display region.

It is preferable that, at least, one of the first display control device or the second display control device displays the image that is to be displayed in the second display region among the images included in the page displayed in the first display region to be smaller than the image displayed in the second display region.

An instruction input device that inputs an instruction to display an image other than the image displayed in the second display region may be further comprised. In this case, for example, it is preferable that the second display control device displays, in the second display region, the image other than the image displayed in the second display region among the images included in the page displayed in the first display region in accordance with the instruction input from the instruction input device.

An image product creation device (image product creation means) that creates an image product using the image displayed in the third display region may be further comprised.

For example, the image product creation device creates an album as the image product by pasting the image displayed in the third display region in an image pasting region corresponding to the image displayed in the second display region on the page displayed in the first display region.

According to the invention, since a consulted image is displayed in the second display region by displaying a page of a consulted album in the first display region, an image to be pasted in a region corresponding to the image pasting region of the consulted album can be found by displaying an image in the third display region by consulting the image displayed in the second display region. An album similar to the consulted album can be relatively easily created.

BRIEF DESCRIPTION OF THE DRAWINGS

FIG. 5 is one example of an album creation window.

FIG. 6 illustrates a relationship and the like between a template and an example album.

DESCRIPTION OF THE PREFERRED EMBODIMENTS

Figure 1:
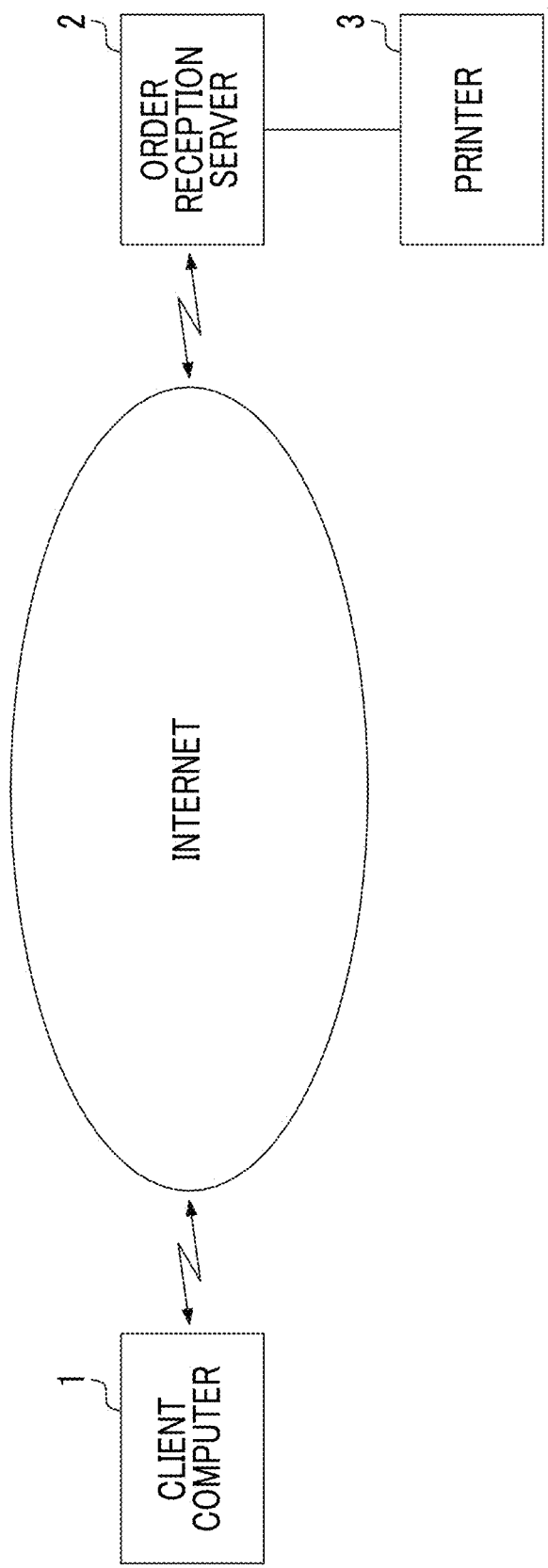
FIG. 1 illustrates a summary of an image processing system.

FIG. 1 illustrates an example of the invention and illustrates a summary of an image processing system.

The image processing system is a system that creates an album by extracting an image from a plurality of images.

The image processing system includes a client computer 1 (one example of an image processing apparatus), an order reception server 2, and a printer 3. The client computer 1 and the order reception server 2 can communicate through the Internet. The printer 3 is connected to the order reception server 2.

In the client computer 1, the image is extracted from the plurality of images, and image data representing the extracted image is transmitted to the order reception server 2. The image data is transmitted from the order reception server 2 to the printer 3, and the album is created in the printer 3 (one example of an image product creation device). The created album is sent to a user of the client computer 1.

Figure 2:
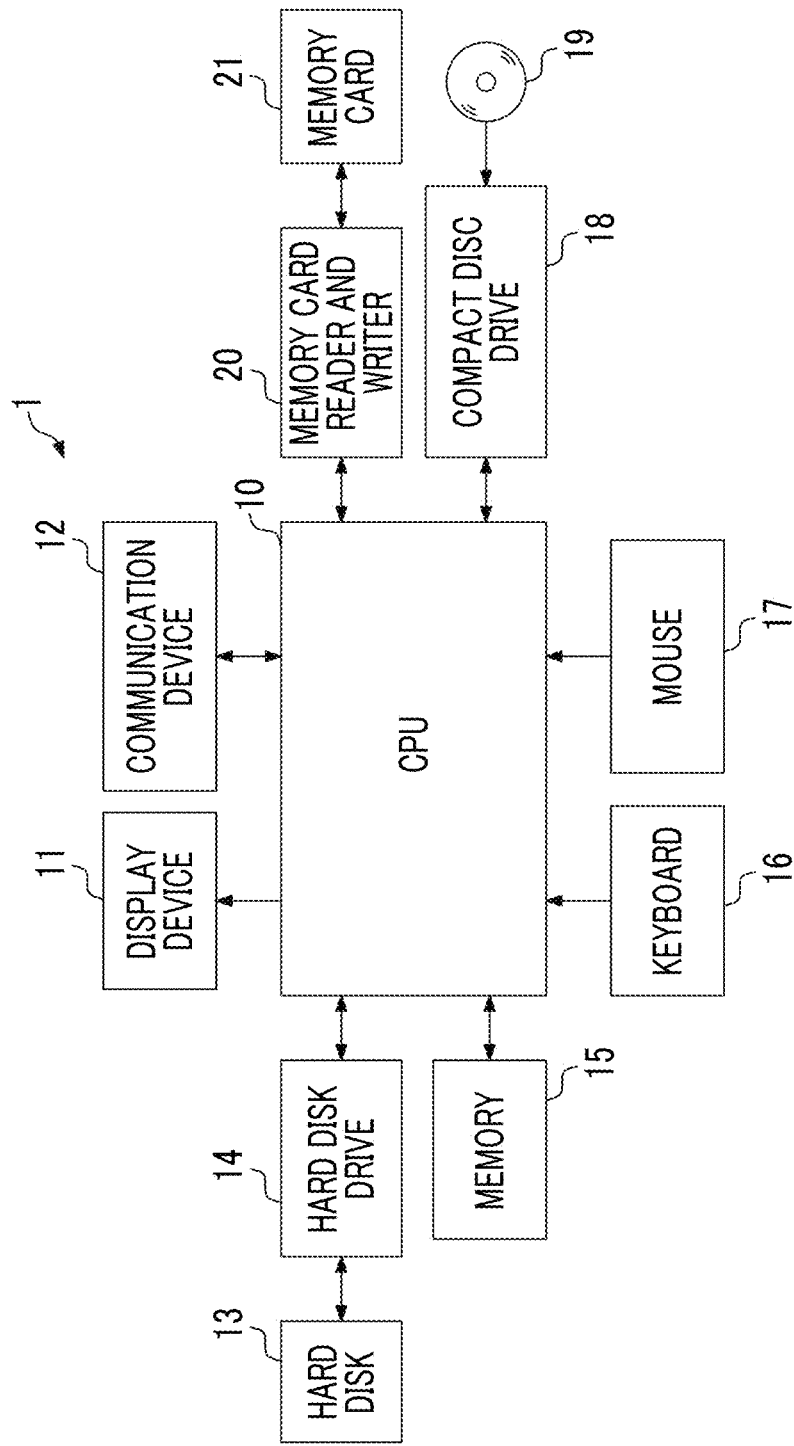
FIG. 2 is a block diagram illustrating an electric configuration of a client computer.

FIG. 2 is a block diagram illustrating an electric configuration of the client computer 1.

An operation of the entire client computer 1 is managed by a central processing unit (CPU) 10.

The client computer 1 includes a display device 11 that displays images and other information on a display screen, and a communication device 12 that communicates with apparatuses and the like other than the client computer 1 by connecting to the Internet and other networks. In addition, the client computer 1 includes a hard disk 13, a hard disk drive 14 that accesses the hard disk 13, a memory 15 that stores data and the like, and a keyboard 16 and a mouse 17 for inputting commands and the like. Furthermore, the client computer 1 includes a compact disc drive 18 that accesses a compact disc 19, and a memory card reader and writer 20 that writes data into a memory card 21 and reads out data recorded on the memory card 21.

An operation program of the client computer 1 described later is received in the communication device 12 through the Internet. The received operation program is installed on the client computer 1. The operation program may be recorded on a portable recording medium such as the compact disc 19 and read out from the portable recording medium, instead of being received by the client computer 1 through a network such as the Internet and installed on the client computer 1. In that case, the operation program read out from the portable recording medium is installed on the client computer 1. A computer (CPU 10) of the client computer 1 can read out the operation program.

Figure 3:
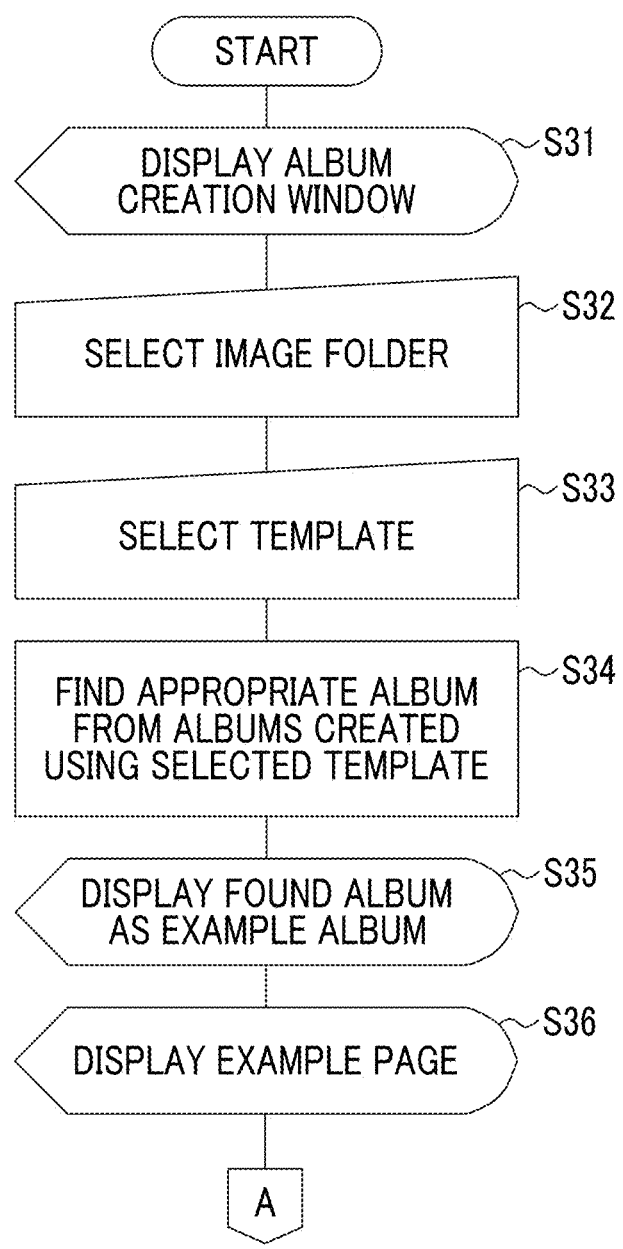
FIG. 3 is a flowchart illustrating a processing procedure of the client computer.
Figure 4:
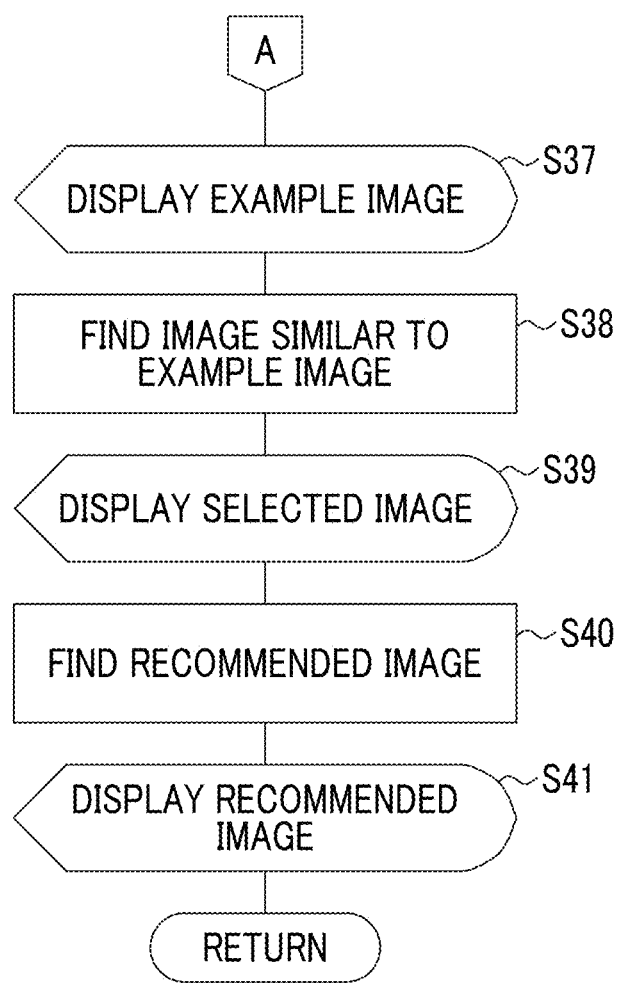
FIG. 4 is a flowchart illustrating a processing procedure of the client computer.

FIG. 3 and FIG. 4 are flowcharts illustrating processing procedures of the client computer 1.

In this example, an album that is the same as an example album is created by consulting an image pasted in the example album. While a case of creating an album of a wedding ceremony is described in this example, the invention is not limited to the album of the wedding ceremony and can also be applied to a case of creating a graduation album, an album representing a recording of growth of a child, and other albums. Any album consisting of a plurality of pages in which an image (picture) is pasted, and including a leaflet, a pamphlet, and the like may be used regardless of a title of the album.

In a case where an album creation program according to this example is started, an album creation window 50 illustrated in FIG. 5 is displayed on the display screen of the display device 11 (step S31).

FIG. 5 is one example of the album creation window 50.

A file menu button 51 on which a character string "file" is displayed, a thumbnail menu button 52 on which a character string "number of thumbnails" is displayed, a window menu button 53 on which a character string "window" is displayed, and a setting menu button 54 on which a character string "setting" is displayed are formed at the upper left of the album creation window 50. For example, the file menu button 51 is clicked by the user in a case of creating a new album. For example, the setting menu button 54 is clicked by the user in a case of designating an image folder that stores images to be pasted in the created new album.

The album creation window 50 includes an album display region 60 (one example of a fifth display region) in which the example album is displayed, a page display region 70 (one example of a first display region) in which an image of an example page is displayed, an example image display region 80 (one example of a second display region) in which an example image is displayed, a selected image display region 90 (one example of a third display region) in which an image selected based on the album creation program or an image selected by the user is displayed, and an image list display region 100 (one example of a fourth display region).

As will be described later, in a case where a template to be used in the album is selected by the user, a plurality of example albums corresponding to the selected template are found. An album that is the most appropriate among the found albums is displayed in the album display region 60. A previous example button 61 on which a character string "previous example" is displayed, and a subsequent example button 62 on which a character string "subsequent example" is displayed are formed in the album display region 60. As described above, the example album is displayed in the album display region 60. An example album that is previous to the album displayed in the album display region 60 among the plurality of found albums is displayed in the album display region 60 by clicking the previous example button 61, and an example album that is subsequent to the album displayed in the album display region 60 among the plurality of found albums is displayed in the album display region 60 by clicking the subsequent example button 62. The display of the album may be a display of information for specifying the album, a display of a front cover of the album, or a display of identification information such as an album number for specifying the album. Alternatively, the identification information on the album may be displayed in a list format.

A previous page button 71 on which a character string "previous page" is displayed, and a subsequent page button 72 on which a character string "subsequent page" is displayed are formed in the page display region 70. In a case where the previous page button 71 is clicked, a page that is previous to the page displayed in the page display region 70 is displayed in the page display region 70. In a case where the subsequent page button 72 is clicked, a page that is subsequent to the page displayed in the page display region 70 is displayed in the page display region 70. As the page displayed in the page display region 70, left and right spread pages may be displayed in the page display region 70 as one page, or any of the left and right spread pages may be displayed in the page display region 70 as one page.

A previous image button 81 on which a character string "previous image" is displayed, and a subsequent image button 82 on which a character string "subsequent image" is displayed are formed in the example image display region 80. In a case where the previous image button 81 is clicked, an image that is previous to the image displayed in the example image display region 80 in the page displayed in the page display region 70 is displayed in the example image display region 80. In a case where the subsequent image button 82 is clicked, an image that is subsequent to the image displayed in the example image display region 80 in the page displayed in the page display region 70 is displayed in the example image display region 80.

A decision button 91 on which a character string "decision" is displayed is formed in the selected image display region 90. In a case where the decision button 91 is clicked, the image displayed in the selected image display region 90 is decided as the image to be pasted in the album.

A recommended image list display region 101 that displays a list of recommended images, or a time-series image list display region 102 that displays images in a time-series order is displayed in the image list display region 100. A recommendation tab on which a character string "recommendation" is displayed is formed at the upper left of the recommended image list display region 101. The recommended image list, display region 101 is displayed in the image list display region 100 by clicking the recommendation tab. A time-series tab on which a character string "time-series" is displayed is formed at the upper left of the time-series image list display region 102. The time-series image list display region 102 is displayed in the image list display region 100 by clicking the time-series tab. The album display region 60, the page display region 70, the example image display region 80, the selected image display region 90, and the image list display region 100 may overlap with each other or may be displayed without overlap.

In a case where the album creation window 50 is displayed, the user designates the image folder storing the images to be used in the album (step S32 in FIG. 3). In a case where the setting menu button 54 is clicked by the user, a setting menu appears on the display screen of the display device 11. In a case where a menu "folder" included in the setting menu is clicked, a folder reference window (not illustrated) appears on the display screen of the display device 11, and a desired image folder is designated using the mouse 17.

Next, the user selects the template to be used in the album (step S33 in FIG. 3). In a case where the file menu button 51 is clicked by the user, a file menu appears on the display screen of the display device 11. In a case where a menu "new creation" included in the file menu is clicked, a new creation window (not illustrated) appears on the display screen of the display device 11, and a desired template is selected using the mouse 17 (one example of a selection device).

In a case where the template is selected, an appropriate album is found as follows from example albums created in the past using the selected template (step S34).

FIG. 6 illustrates a relationship and the like between the template (it is assumed that a template T1 is selected) selected by the user and the example albums created using the template.

It is assumed that the example albums created using the template T1 include an example album Ab1 to an example album Ab10. In the example album Ab1, an example image Ir100 to an example image Ir199 are pasted in an image pasting region of the template T1.

Figure 7:
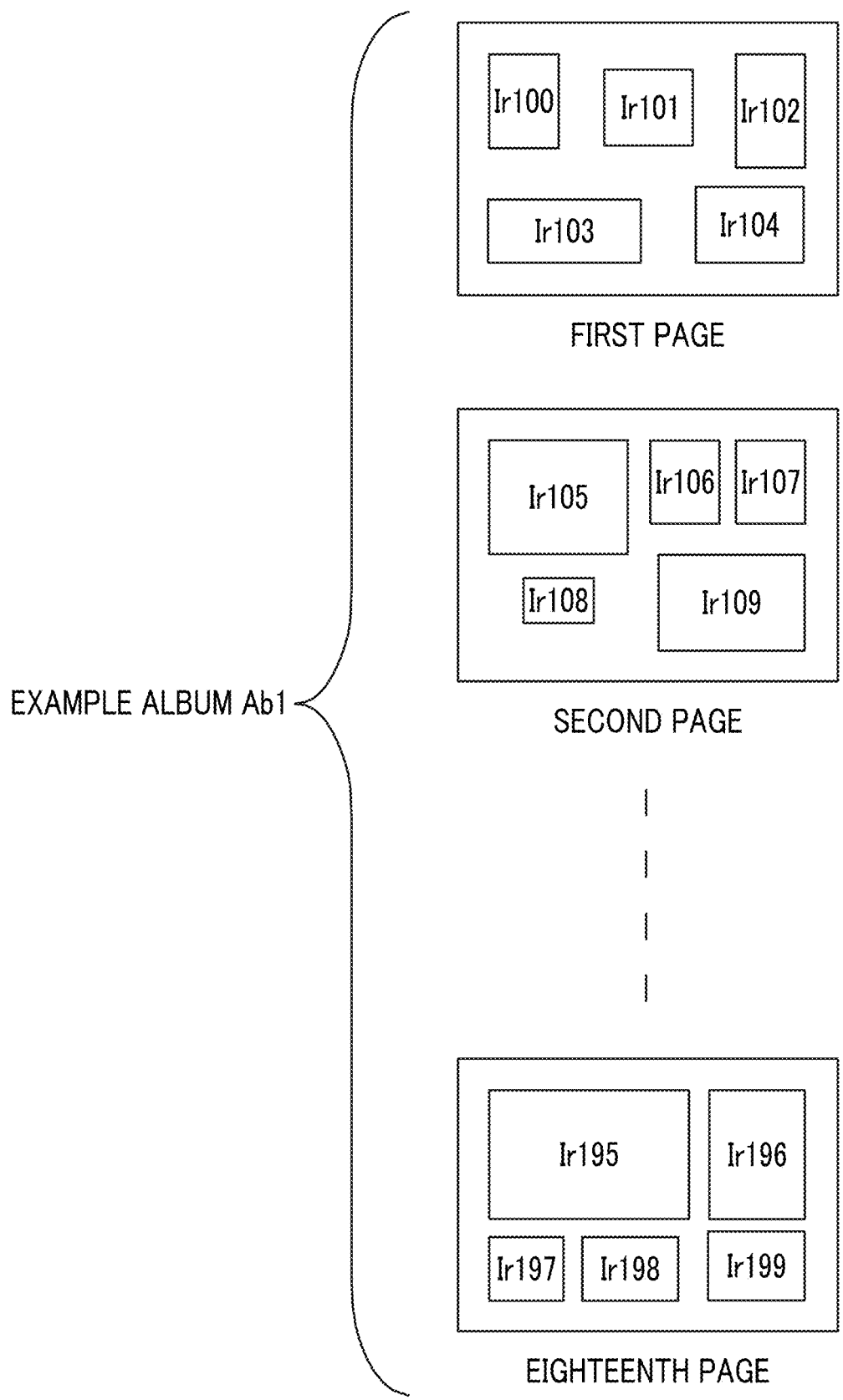
FIG. 7 illustrates each page constituting the example album.

FIG. 7 illustrates a part of pages constituting the example album Ab1.

The example album Ab1 includes a first page to an eighteenth page in a spread (excluding a front cover and a back cover). The example image Ir100 to the example image Ir104 are pasted on the first page in accordance with a layout of the template T1. The example image Ir105 to the example image Ir109 are pasted on the second page in accordance with the layout of the template T1. Example images are also pasted on the other pages in accordance with the layout of the template T1. The example image Ir195 to the example image Ir199 are pasted on the eighteenth page in accordance with the layout, of the template T1.

In the example album Ab2 to the example album Ab10 other than the example album Ab1, an example image Ir200 to an example image Ir1099 are pasted in accordance with the layout of the template T1 like the example album Ab1. The example images Ir200 to Ir299, Ir300 to Ir399, Ir400 to Ir499, Ir500 to Ir599. Ir600 to Ir699, Ir700 to Ir799, Ir800 to Ir899, Ir900 to Ir999, and Ir1000 to Ir1099 are pasted in the example albums Ab2, Ab3, Ab4, Ab5, Ab6, Ab7, Ab8, Ab9, and Ab10, respectively.

An example image of which a degree of similarity with the images stored in the image folder set by the user is greater than or equal to a threshold value is found among the example images Ir100 to Ir1099 pasted in the example albums Ab1 to Ab10. An example album in which the found example image of which the degree of similarity is greater than or equal to the threshold value is most frequently used is appropriate as an example album to be used by the user.

The example album found in such a manner is displayed in the album display region 60 by the CPU 10 (one example of a fifth display control device) (step S35 in FIG. 3). In this example, it is assumed that the example album Ab1 is the appropriate example album.

Figure 8:
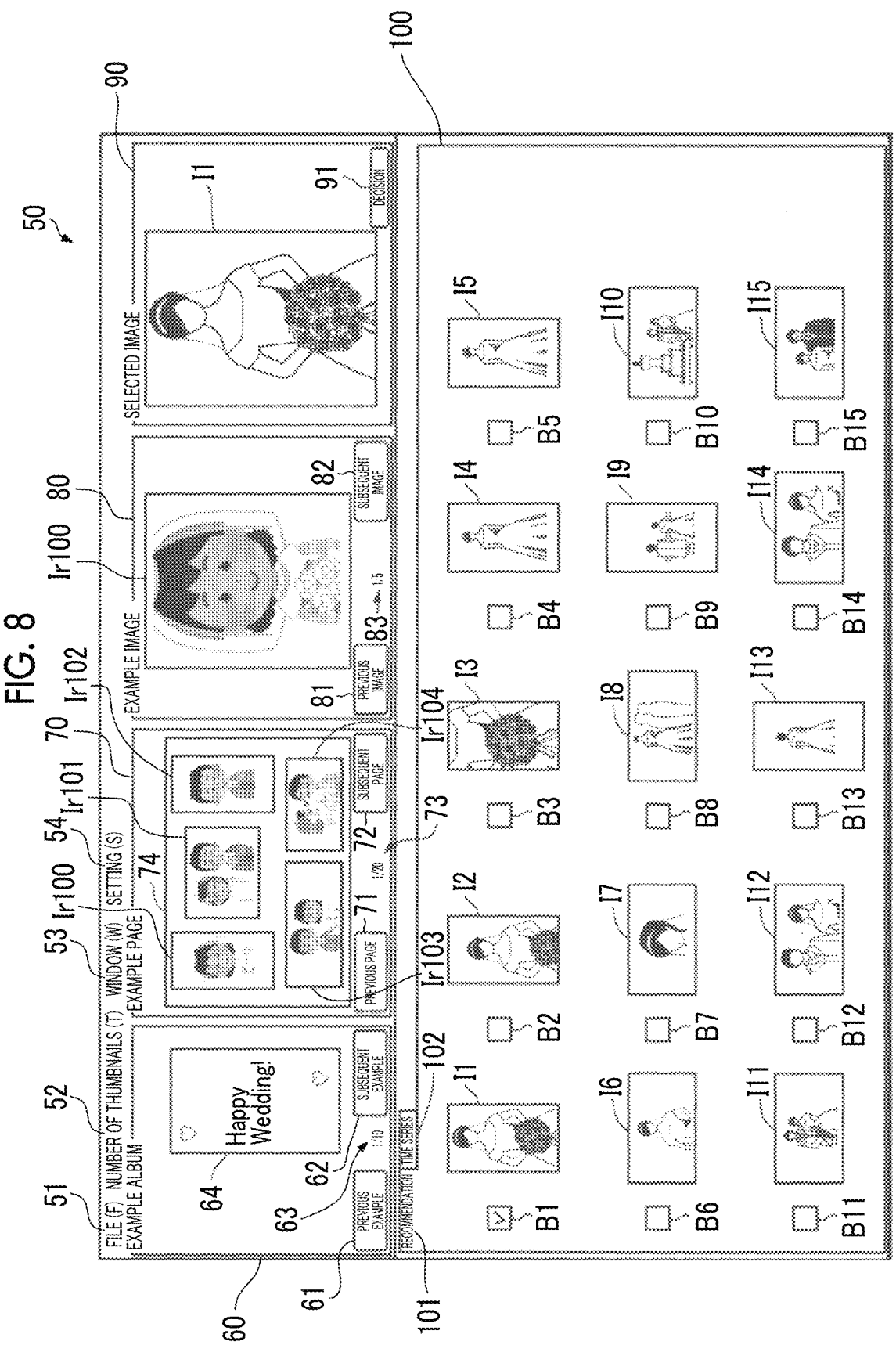
FIG. 8 is one example of the album creation window.

FIG. 8 is one example of the album creation window 50.

A front cover 64 of the example album Ab1 is displayed in the album display region 60 of the album creation window 50. By viewing the front cover 64, the user perceives that the album may be created by consulting the example album Ab1 having the front cover 64. A front cover of any of the example albums Ab2 to Ab10 other than the front cover 64 of the example album Ab1 displayed in the album display region 60 is displayed in the example album display region 60 by clicking the previous example button 61 or the subsequent example button 62. A character string 63 indicating an ordinal number of the example album of which the front, cover is displayed among the example albums Ab1 to Ab10 of the template T1 selected by the user is displayed at the center of a lower portion of the example album display region 60. A denominator of the character string 63 is the number of example albums Ab1 to AB10 of the template T1 selected by the user, and a numerator of the character string 63 is a number indicating the ordinal number of the album displayed in the album display region 60.

In an initial state of the page display region 70 displayed by the CPU 10 (one example of a first display control device), the first page of the album displayed in the album display region 60 is displayed (step S36 in FIG. 3). In the example illustrated in FIG. 8, since the front cover 64 of the example album Ab1 is displayed in the album display region 60, a first page 74 of the example album Ab1 is displayed. As described above, the example images Ir100, Ir101, Ir102, Ir103, and Ir104 are pasted on the first page 74. A page previous to the page displayed in the page display region 70 is displayed in the page display region 70 by clicking the previous page button 71 (in this case, since the previous page is not present, the previous page button 71 cannot be clicked). A page subsequent to the page displayed in the page display region 70 is displayed in the page display region 70 by clicking the subsequent page button 72. A character string 73 that indicates an ordinal number of the page displayed in the page display region 70 in the example album is displayed at the center of a lower portion of the page display region 70. A denominator of the character string 73 is the total number of pages of the album, and a numerator of the character string 73 indicates the ordinal number of the page displayed in the page display region 70.

Furthermore, in an initial state of the example image display region 80 displayed by the CPU 10 (one example of a second display control device), the first image of the images pasted on the page displayed in the page display region 70 is displayed (step S37 in FIG. 4). In the example illustrated in FIG. 8, since the first page 74 of the example album Ab1 is displayed in the page display region 70, the first example image Ir100 (one example of one image) of the first page 74 is displayed in the example image display region 80. The example image Ir100 displayed in the page display region 70 is smaller than the example image Ir100 displayed in the example image display region 80. The example image Ir100 displayed in the example image display region 80 is larger and thus, is easily checked. Among the example images Ir100 to Ir104 pasted on the page 74 displayed in the page display region 70, an image previous to the example image Ir100 displayed in the example image display region 80 is displayed in the example image display region 80 by clicking the previous image button 81 (in this case, since the image previous to the example image Ir100 is not present, the previous image button 81 cannot be clicked; however, the last example image of images pasted on a page previous to the page on which the example image Ir100 is pasted may be displayed). An image subsequent to the image Ir100 displayed in the example image display region 80 is displayed in the example image display region 80 by clicking the subsequent image button 82. A character string 83 that indicates an ordinal number of the example image Ir100 displayed in the example image display region 80 on the page is displayed at the center of a lower portion of the example image display region 80. A denominator of the character string 83 indicates the total number of images on the page on which the example image Ir100 is displayed, and a numerator of the character string 83 indicates the ordinal number of the example image Ir100 among the images displayed on the page.

A degree of similarity with the example image Ir100 displayed in the example image display region 80 is calculated for the images stored in the image folder selected by the user {images that are recorded on the memory card 21 or the like and are read out into the client computer by the memory card reader and writer 20 (one example of an image input device that inputs a plurality of images)}. An image of which the degree of similarity with the example image Ir100 displayed in the example image display region 80 is greater than or equal to the threshold value and is the highest is found from the images stored in the image folder selected by the user (step S38 in FIG. 4). The found image is displayed in the selected image display region 90 displayed by the CPU 10 (one example of a third display control device) as a selected image 92 (one example of an image different from an image displayed in a second display region) (step S39 in FIG. 4). In a case where the decision button 91 formed in the selected image display region 90 is clicked, the selected image 92 displayed in the selected image display region 90 is decided as an image to be pasted at a position of the page at which the example image Ir100 is pasted.

Next, an image of which the degree of similarity with the example image Ir100 displayed in the example image display region 80 is greater than or equal to the threshold value is found from the images stored in the image folder selected by the user (step S40 in FIG. 4). A list of found images is displayed in the recommended image display region 101 displayed by the CPU 10 (one example of a fourth display control device) (step S41 in FIG. 4).

Recommended images I1 to I15 are displayed in the recommended image display region 101 in a descending order of the degree of similarity with the example image Ir100 displayed in the example image display region 80. Images similar to the example image can be perceived. Images not displayed in the recommendation region 101 are displayed in the recommended image display region 101 by scrolling. Checkboxes B1 to B15 are formed on a left side of the recommended images I1 to I15. The recommended image I1 is displayed in the selected image display region 90 among the recommended images I1 to I15 displayed in the recommended image display region 101. Thus, the checkbox B1 formed on the left side of the recommended image I1 is checked. In a case of displaying an image other than the recommended image I1 in the selected image display region 90, any of the checkboxes B1 to B15 formed on the left side of the recommended image to be displayed is checked. A desired image can be selected. For example, in a case where the checkbox B2 is checked by the mouse 17 (one example of a designation device), the recommended image I2 corresponding to the checkbox B2 is displayed in the selected image display region 90, and the check of the checkbox B1 is deleted. By displaying the desired image in the selected image display region 90, the user can decide the image to be pasted in the album while comparing the image with the example image Ir100 displayed in the example image display region 80. Alternatively, without displaying the image list display region 100 (the recommended image display region 101 and the time-series image list display region 102), an image changing button or the like may be disposed inside or outside the selected image display region 90, and the image displayed in the selected image display region 90 may be switched in accordance with a click on the image changing button or the like. The image that is switched and displayed may be in order of the degree of similarity with the example image Ir100 or not in order of the degree of similarity. In a case where the number of images displayed in the recommended image display region 101 is large, the number of images displayed in the recommended image display region 101 may be decreased by increasing the threshold value of the degree of similarity. Conversely, in a case where the number of images displayed in the recommended image display region is small, the number of images displayed in the recommended image display region 101 may be increased.

In a case of the state illustrated in FIG. 8, in a case where the previous example button 61 formed in the album display region 60 is clicked, the front cover of the example album Ab10 is displayed instead of the front cover 64 of the example album Ab1 displayed in the album display region 60. In a case where the subsequent example button 62 formed in the album display region 60 is clicked, the front cover of the subsequent example album Ab2 is displayed instead of the front cover 64 of the example album Ab1 displayed in the album display region 60. In a case where the previous example button 61 is clicked, the first page of the example album Ab10 is displayed in the album display region 60. In a case where the subsequent example button 62 is clicked, the first page of the example album Ab2 is displayed in the album display region 60.

In a case where a page previous to the page 70 displayed in the page display region 70 is present, the previous page is displayed in the page display region 70 in a case where the previous page button 71 is clicked. The first example image of the previous page is displayed in the example image display region 80. In a case where a page subsequent to the page 70 displayed in the page display region 70 is present, the subsequent page is displayed in the page display region 70 in a case where the subsequent page button 72 is clicked. The first example image of the subsequent page is displayed in the example image display region 80.

In a case where the previous image button 81 or the subsequent image button 82 formed in the example image display region 80 is clicked, a switching instruction is generated, and the example image displayed in the example image display region 80 is switched. However, even in a case where the previous image button 81 or the subsequent image button 82 formed in the example image display region 80 is not clicked, the switching instruction is generated by clicking the previous example button 61 or the subsequent example button 62 formed in the album display region 60, or the previous page button 71 or the subsequent page button 72 formed in the page display region 70, and the example image Ir100 displayed in the example image display region 80 is switched.

Figure 9:
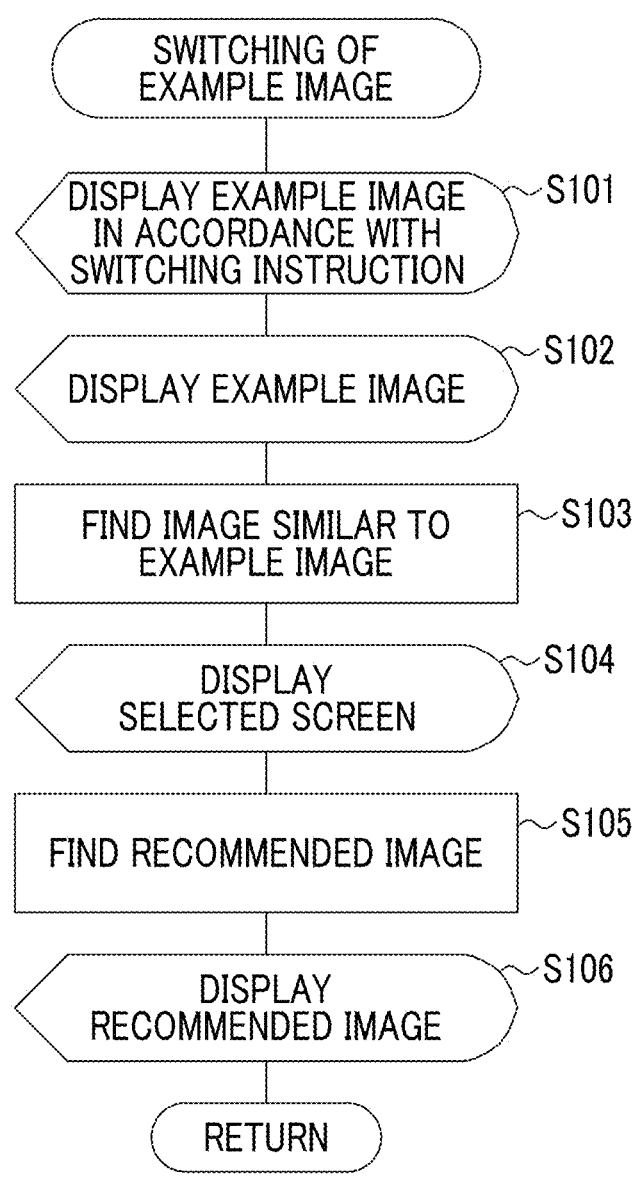
FIG. 9 is a flowchart illustrating a processing procedure of switching an example image.

FIG. 9 is a flowchart illustrating a processing procedure of the client computer 1 in a case where the switching instruction is generated.

As described above, in a case where the previous example button 61, the subsequent example button 62, the previous page button 71, the subsequent page button 72, the previous image button 81, or the subsequent image button 82 (one example of an instruction input device) is clicked, the switching instruction is generated, and the example image corresponding to the clicked button is displayed in the example image display region 80 (step S101).

In a case where a new example image (one example of an image other than the image displayed in the example image display region 80 among the images included in the page displayed in the page display region 70) is displayed in the example image display region 80 by switching the example image displayed in the example image display region 80 (step S102), the degree of similarity with the switched example image is calculated for the images stored in the image folder designated by the user. An image of which the calculated degree of similarity is the highest is found (step S103), and the found image is displayed in the selected image display region 90 (step S104). In addition, images of which the degree of similarity is greater than or equal to the threshold value are found from the images stored in the image folder designated by the user (step S105), and the images stored in the image folder designated by the user are displayed in the recommended image display region 101 in a descending order of the degree of similarity (step S106).

In such a manner, each time the example image displayed in the example image display region 80 is changed, the image displayed in the selected image display region 90 is switched, and the images displayed in the recommended image display region 101 and a display order of the images are also changed.

Figure 10:
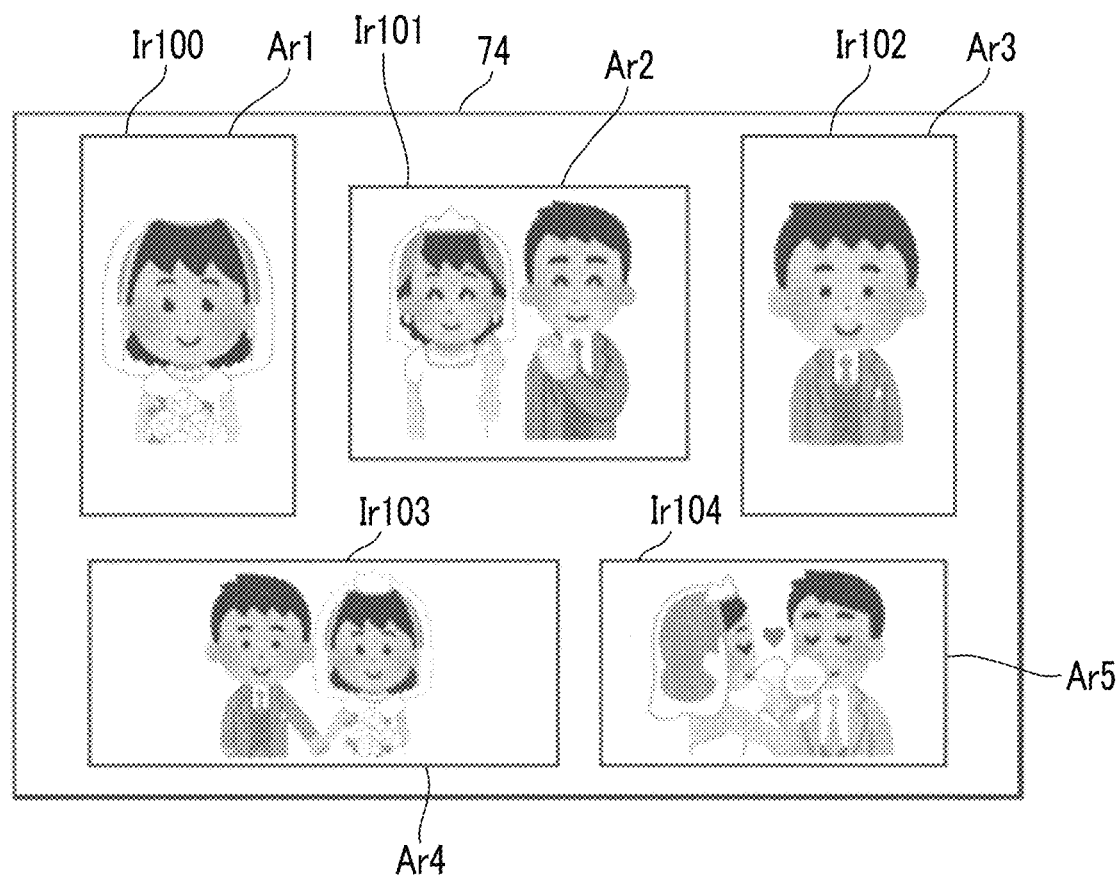
FIG. 10 is one example of an example page.
Figure 11:
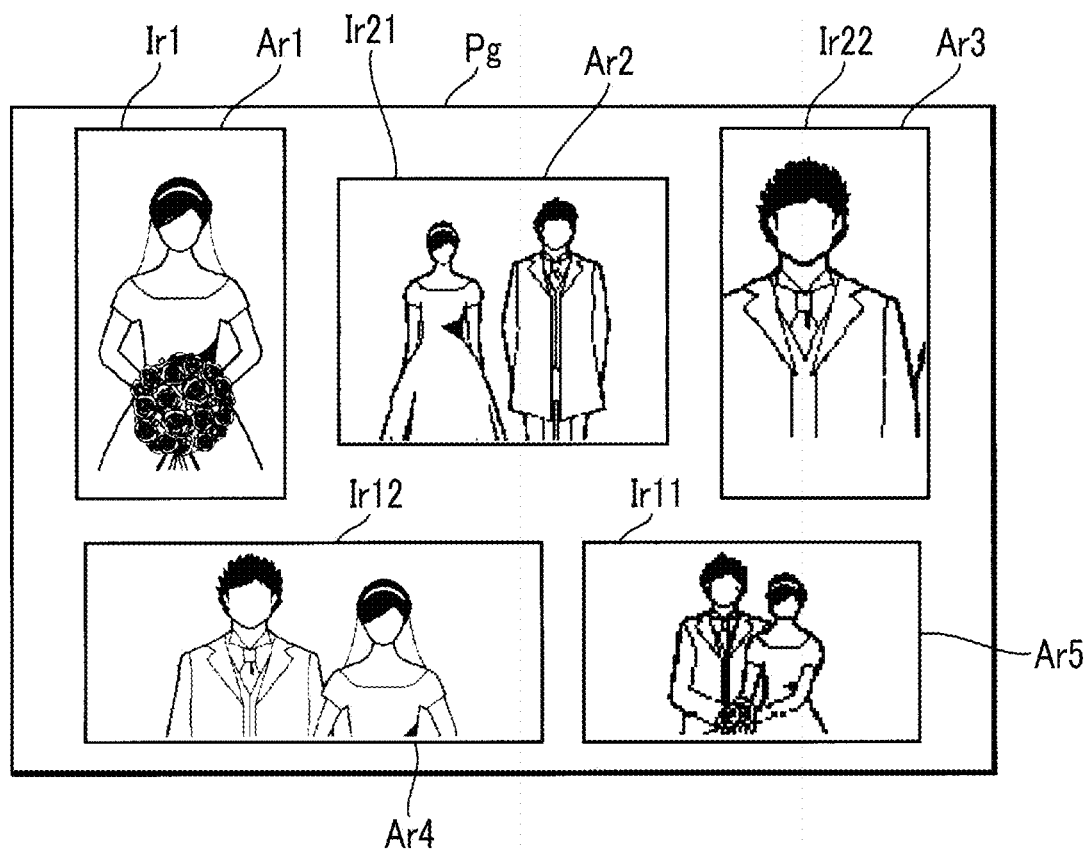
FIG. 11 is one example of a page of a created album.

FIG. 10 is one example of the example page 74 displayed in the page display region 70 and is enlarged compared to the example page 74 illustrated in FIG. 8. FIG. 11 is one example of a page Pg constituting the album created by consulting the example page 74.

With reference to FIG. 10, image pasting regions Ar1, Ar2, Ar3, Ar4, and Ar5 are formed on the example page 74, and the example images Ir100, Ir101, Ir102. Ir103, Ir104, and Ir105 are pasted in the image pasting regions Ar1, Ar2, Ar3, Ar4, and Ar5, respectively.

With reference to FIG. 11, the image pasting regions Ar1, Ar2, Ar3, Ar4, and Ar5 are formed on the page Pg in the same layout as the example page. Images Ir1, Ir21, Ir22, Ir12, and Ir11 stored in the image folder selected by the user are pasted in the image pasting regions Ar1, Ar2, Ar3, Ar4, and Ar5, respectively.

The image Ir1 pasted in the image pasting region Ar1 of the page Pg illustrated in FIG. 11 is an image that is selected by consulting the image Ir100 pasted in the image pasting region Ar1 of the example page 74 illustrated in FIG. 10 and has a high degree of similarity of composition or the like. Similarly, all of the example image Ir101 pasted in the image pasting region Ar2 in FIG. 10 and the image Ir21 pasted in the image pasting region Ar2 in FIG. 11, the example image Ir102 pasted in the image pasting region Ar3 in FIG. 10 and the image Ir22 pasted in the image pasting region Ar3 in FIG. 11, the example image Ir103 pasted in the image pasting region Ar4 in FIG. 10 and the image Ir12 pasted in the image pasting region Ar4 in FIG. 11, and the example image Ir104 pasted in the image pasting region Ar5 in FIG. 10 and the image Ir11 pasted in the image pasting region Ar5 in FIG. 11 are pairs of images having a high degree of similarity of composition or the like. The album of the page Pg having the same impression as the example page 74 is created. By transmitting data representing the page Pg generated in such a manner to the order reception server 2, a paper album is created by the printer 3. Alternatively, data representing the album may be created in the order reception server 2 by transmitting template data, data representing the selected image, and data indicating a pasting position or the like of the image to the order reception server 2. A page other than the page Pg can also be created in the same manner as the example page of the example album, and the user can create the same album as the example album.

While the image displayed in the selected image display region 90, the images displayed in the recommended image display region 101, and the order of the images are decided based on the degree of similarity with the example image displayed in the example image display region 80, the degree of similarity may be not only the degree of similarity obtained by simply comparing images but also a degree of matching between information on a face included in the example image and information on a face included in the images stored in the image folder selected by the user (the information on the face is any information perceived from the face and may be any of the number of faces included in the image, a size of the face with respect to the image, or a sex perceived from the face). For example, face recognition processing may be performed on each of the face included in the example image and the face included in the images stored in the image folder designated by the user, and the degree of matching of the face obtained from the face recognition may be used as the degree of similarity. Alternatively, a degree of similarity between capturing timings of images may be used as the degree of similarity. For example, in a case where the degree of matching between a capturing timing of the example image and a capturing timing of the images stored in the image folder designated by the user is high, the degree of similarity may be high.

Figure 12:
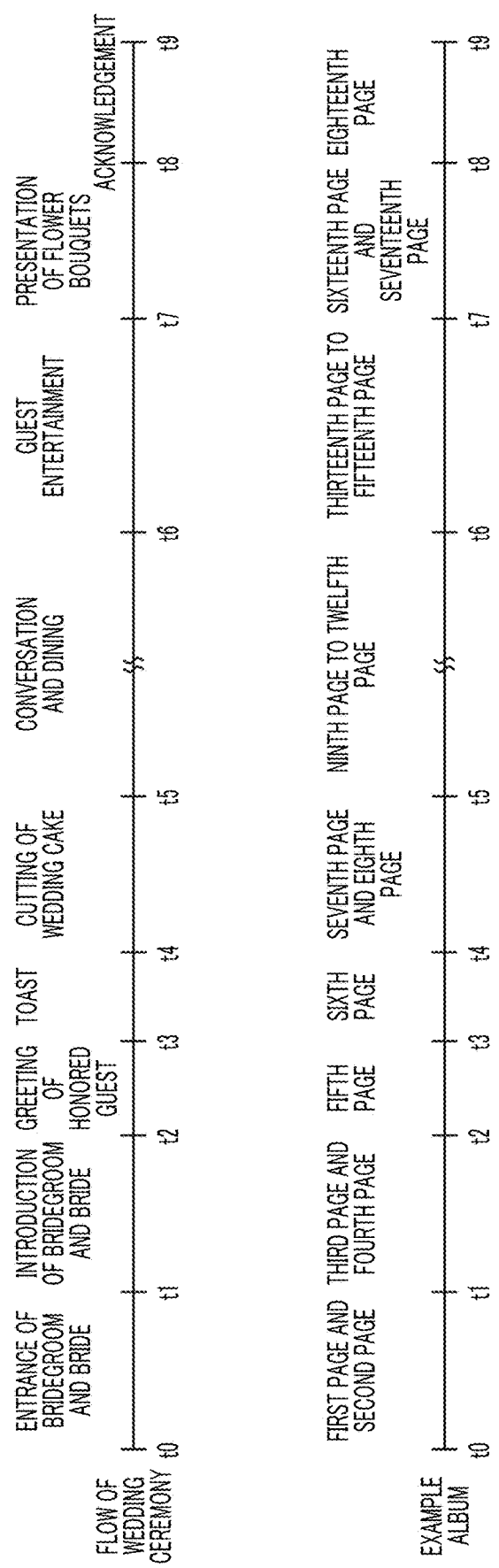
FIG. 12 illustrates a flow and the like of wedding ceremony.

FIG. 12 illustrates a relationship between a flow of wedding ceremony and timings at which the example images Ir100 to Ir199 pasted on each page of the example album Ab1 are captured at the wedding ceremony.

For example, the wedding ceremony is started at time t0, and a bridegroom and a bride enter from time t0 to time t1. The bridegroom and the bride are introduced from time t1 to time t2, and greeting of an honored guest is performed from time t2 to time t3. A toast is made from time t3 to time t4. A wedding cake is cut from time t4 to time t5. Conversation and dining are performed from time t5 to time t6. Guest entertainment is performed from time t6 to time t7. Flower bouquets are presented to parents from time t7 to time t8. Acknowledgement of the bridegroom and the bride is performed from time t8 to time t9. In such a manner, in an event such as the wedding ceremony, a general flow is decided, and a target captured in each time range is also decided.

In the example album, example images having contents following the flow in the event are pasted in the example album. For example, images corresponding to "entrance of the bridegroom and the bride" performed from time t0 to time t1 are pasted on the first page and the second page of the example album. Images corresponding to "introduction of the bridegroom and the bride" are pasted on the third page and the fourth page of the example album. Similarly, images corresponding to "greeting of the honored guest" are pasted on the fifth page of the example album. Images corresponding to "toast" are pasted on the sixth page of the example album. Images corresponding to "cutting of the wedding cake" are pasted on the seventh page and the eighth page of the example album. Images corresponding to "conversation and dining" are pasted on the ninth page to the twelfth page of the example album. Images corresponding to "guest entertainment" are pasted on the thirteenth page to the fifteenth page of the example album. Images corresponding to "presentation of the flower bouquets" are pasted on the sixteenth page and the seventeenth page of the example album. Images corresponding to "acknowledgement" are pasted on the eighteenth page of the example album.

A capturing time is recorded in a header of an image file. Thus, a capturing timing at which the image is captured is perceived by consulting the capturing time. Among the images stored in the image file selected by the user, the degree of similarity of an image having the same capturing timing as the capturing timing of the image displayed in the example image display region 80 can be corrected to be increased, and the degree of similarity of an image having a capturing timing different from the capturing timing of the image displayed in the example image display region 80 can be corrected to be decreased. An image of which the corrected degree of similarity is the highest can be displayed in the selected image display region 90. In addition, the images can be displayed in the recommendation region 101 in a descending order of the corrected degree of similarity.

For example, in FIG. 8, in a case where the capturing timing is not considered, it is assumed that the degree of similarity between the example image Ir100 and the image I1 is 0.8, and that the degree of similarity between the example image Ir100 and the image Ir2 is 0.75. In a case where the capturing timing is not, considered, the image I1 is found as the image of which the degree of similarity with the example image Ir100 is the highest, and the image I1 is displayed in the selected image display region 90. Meanwhile, the example image Ir100 is an image of the first page and thus, is considered to be an example image of a scene of "entrance of the bridegroom and the bride" from time t0 to time t1. It is assumed that the image I1 is captured in a scene of "presentation of the flower bouquets" from time t7 to time t8, and that the image I2 is captured in the scene of "entrance of the bridegroom and the bride" from time t0 to time t1. The image I2 is an image captured in the scene of "presentation of the flower bouquets" and is considered not to be suitable for the first page and the second page on which the images of "entrance of the bridegroom and the bride" are pasted. For example, a correction value of the degree of similarity of the capturing timing of the image I1 is 0, and a correction value of the degree of similarity of the capturing timing of the image I2 is 0.1. The degree of similarity of the image I1 is 0.8+0=0.8 since the correction value is 0, and the degree of similarity of the image I2 is 0.75+0.1=0.85 since the correction value is 0.1. The degree of similarity of the image I2 is greater than the degree of similarity of the image I1, and the image I2 is displayed in the selected image display region 90.

In such a manner, the degree of similarity may be increased considering the capturing timing. The capturing timing may be the capturing time.

In the above example, images to be displayed in the recommended image display region 101 are selected and displayed in accordance with a magnitude of the degree of similarity, and images to be displayed in the time-series image list display region 102 are selected in accordance with a time series. Alternatively, other selection methods and display methods may be employed. For example, while the images to be displayed in the recommended image display region 101 are selected in accordance with the magnitude of the degree of similarity in a case where the degree of matching of the capturing timing is not considered, a display method of providing a mark indicating preference near an image of which the degree of matching of the capturing timing is higher than a threshold value may be employed. In addition, for example, while selection of the images to be displayed in the time-series image list display region 102 in accordance with the time series does not change from the above example, a display method of providing the mark indicating preference near an image of which the degree of similarity with the image displayed in the example image display region 80 is higher than the threshold value may be employed.

While the album of the wedding ceremony is created in the above example, an album other than the album of the wedding ceremony may be created by consulting the example album. For example, an album summarizing school events for one year may be created. In this case, even in a case where a new album is created using an album created one year ago as an example, the degree of similarity between images captured in the same time period may be increased since events performed for one year are generally performed in the same time period each year.

Processing portions executing the above processing include not only the CPU 10 that functions as various processing portions by executing software, but also a programmable logic device such as a field-programmable gate array (FPGA) that has a circuit configuration changeable after manufacturing, a dedicated electric circuit such as an application specific integrated circuit (ASIC) that is a processor having a circuit configuration dedicatedly designed to execute a specific type of processing, and the like.

One processing portion may be configured with one of those various processors or may be configured with a combination of two or more processors of the same type or different types (for example, a plurality of FPGAs or a combination of a CPU and an FPGA). As an example of configuring a plurality of processing portions with one processor, first, as represented by a computer such as a client computer or a server, a form in which one processor is configured with a combination of one or more CPUs and software, and in which this processor functions as the plurality of processing portions is available. Second, as represented by a system on chip or the like, a form in which a processor that implements a function of the entire system including the plurality of processing portions in one integrated circuit (IC) chip is used is available. In such a manner, various processing portions are configured using one or more of various processors as a hardware structure.

Furthermore, the hardware structure of those various processors is more specifically an electric circuit in which circuit elements such as semiconductor elements are combined.

What is claimed is:

1. An image processing apparatus comprising:
   a first display control device that controls a display device to display a first display region on a display screen, the first display region displaying a composite of a plurality of images on a single page;
   a second display control device that controls the display device to display a second display region on the display screen, the second display region displaying one image of images pasted in an image pasting region of the composite displayed in the first display region; and
   a third display control device that controls the display device to display a third display region on the display screen, the third display region displaying an image different from the image displayed in the second display region,
   wherein the third display control device displays, in the third display region, an image of which a degree of similarity with the image displayed in the second display region is greater than or equal to a threshold value.

2. The image processing apparatus according to claim 1, further comprising:
   an image input device that inputs a plurality of images,
   wherein the third display control device displays, in the third display region, an image of which a degree of similarity with the image displayed in the second display region is greater than or equal to a threshold value among the plurality of images input from the image input device.

3. The image processing apparatus according to claim 2, further comprising:
   a fourth display control device that controls the display device to display a fourth display region on the display screen, the fourth display region displaying the plurality of images input from the image input device.

4. The image processing apparatus according to claim 3, wherein the fourth display control device displays, in the fourth display region, the plurality of images input from the image input device in order of a degree of similarity with images to be displayed in the third display region.

5. The image processing apparatus according to claim 4, wherein the degree of similarity is increased as at least one of the degree of similarity with the image displayed in the second display region, a degree of matching of information with respect to a face included in the image displayed in the second display region, or a degree of matching of a capturing timing with respect to the image displayed in the second display region is increased.

6. The image processing apparatus according to claim 3, further comprising:
a designation device that designates any image of the plurality of images displayed in the fourth display region,
wherein the third display control device displays the image designated by the designation device in the third display region.

7. The image processing apparatus according to claim 1, wherein at least one of the first display control device or the second display control device displays the image that is to be displayed in the second display region among the images included in the composite displayed in the first display region to be smaller than the image displayed in the second display region.

8. The image processing apparatus according to claim 1, further comprising:
an instruction input device that inputs an instruction to display an image other than the image displayed in the second display region,
wherein the second display control device displays, in the second display region, the image other than the image displayed in the second display region among the images included in the composite displayed in the first display region in accordance with the instruction input from the instruction input device.

9. The image processing apparatus according to claim 1, further comprising:
an image product creation device that creates an image product using the image displayed in the third display region.

10. The image processing apparatus according to claim 9, wherein the image product creation device creates a composite as the image product by pasting the image displayed in the third display region in an image pasting region corresponding to the image displayed in the second display region on the composite displayed in the first display region.

11. An image processing apparatus comprising:
a processor, and
the processor controls a display device to display a first display region on a display screen,
the first display region displaying a page of a composite of a plurality of images on a single page,
controls the display device to display a second display region on the display screen, the second display region displaying only one image of images pasted in an image pasting region of the composite displayed in the first display region,
controls the display device to display a third display region on the display screen, the third display region displaying only one image different from the only one image displayed in the second display region, and
controls the display device to display, in the third display region, an image of which a degree of similarity with the image displayed in the second display region is greater than or equal to a threshold value.

12. An image processing method comprising:
controlling a display device to display a first display region on a display screen by a first display control device, the first display region displaying a composite of a plurality of images on a single page;
controlling the display device to display a second display region on the display screen by a second display control device, the second display region displaying one image of images pasted in an image pasting region of the composite displayed in the first display region; and
controlling the display device to display a third display region on the display screen by a third display control device, the third display region displaying an image different from the image displayed in the second display region,
wherein the third display control device displays, in the third display region, an image of which a degree of similarity with the image displayed in the second display region is greater than or equal to a threshold value.

13. A non-transitory computer-readable recording medium storing the program that controls a computer of an image processing apparatus and is readable by the computer, the program controlling the computer to perform:
controlling a display device to display a first display region on a display screen, the first display region displaying a composite of a plurality of images on a single page;
controlling the display device to display a second display region on the display screen, the second display region displaying one image of images pasted in an image pasting region of the composite displayed in the first display region; and
controlling the display device to display a third display region on the display screen, the third display region displaying an image different from the image displayed in the second display region,
wherein the third display control device displays, in the third display region, an image of which a degree of similarity with the image displayed in the second display region is greater than or equal to a threshold value.

* * * * *